(12) United States Patent
Huang

(10) Patent No.: US 9,882,194 B2
(45) Date of Patent: Jan. 30, 2018

(54) CONDUCTIVE CONNECTING PLATE FOR A LITHIUM BATTERY AND A METHOD FOR FORMING THE SAME

(71) Applicant: DIJIYA ENERGY SAVING TECHNOLOGY INC., New Taipei (TW)

(72) Inventor: Wen-Hung Huang, New Taipei (TW)

(73) Assignee: Dijiya Energy Saving Technology Inc., New Taipei (TW)

(*) Notice: Subject to any disclaimer, the term of this patent is extended or adjusted under 35 U.S.C. 154(b) by 0 days.

(21) Appl. No.: 15/394,065

(22) Filed: Dec. 29, 2016

(65) Prior Publication Data

US 2017/0256773 A1    Sep. 7, 2017

(30) Foreign Application Priority Data

Mar. 2, 2016  (TW) .............................. 105106389 A

(51) Int. Cl.
| | |
|---|---|
| *H01M 2/20* | (2006.01) |
| *H01R 12/57* | (2011.01) |
| *H01M 2/26* | (2006.01) |
| *H01R 11/01* | (2006.01) |
| *H01R 43/16* | (2006.01) |

(52) U.S. Cl.
CPC ............ *H01M 2/263* (2013.01); *H01R 11/01* (2013.01); *H01R 43/16* (2013.01)

(58) Field of Classification Search
CPC ......... Y02E 60/12; H01M 2/20; H01M 2/206; H01R 13/2442; H01R 12/57

USPC ......................................... 439/627, 500, 862
See application file for complete search history.

(56) References Cited

U.S. PATENT DOCUMENTS

| | | | | |
|---|---|---|---|---|
| 1,460,604 | A * | 7/1923 | Potter | H01M 2/204 439/627 |
| 2,449,550 | A * | 9/1948 | Eichberg | H01M 2/105 429/1 |
| 2,449,568 | A * | 9/1948 | Shriro | F21L 4/00 30/43.92 |
| 5,395,263 | A * | 3/1995 | Sandell | H01M 2/1022 429/100 |
| 6,087,037 | A * | 7/2000 | Rieder | H01M 2/1044 429/100 |
| 6,603,670 | B1 * | 8/2003 | Chien | H01M 2/1022 361/801 |

(Continued)

*Primary Examiner* — Gary Paumen
(74) *Attorney, Agent, or Firm* — Muncy, Geissler, Olds & Lowe, P.C.

(57) ABSTRACT

A conductive connecting plate for a lithium battery and a method for forming the same are provided. By punching a metal plate in a generally linear shape, the conductive connecting plate is formed to comprise an elongated positioning plate, a bending plate, and a first extending plate. The elongated positioning plate has a first and a second end in an elongated direction. The bending plate extends vertically downwards from the second end in a direction away from the second end. The first extending plate extends horizontally from one side of the bending plate in a direction away from and perpendicular to that side. Thereby, when the elongated positioning plate and first extending plate are electrically connected with a terminal component and a tab-set of a lithium battery core, it can meet the requirement for the charge and discharge of high-rate and large current.

11 Claims, 5 Drawing Sheets

(56) References Cited

U.S. PATENT DOCUMENTS

| | | | | |
|---|---|---|---|---|
| 7,563,105 B2* | 7/2009 | Liu | ............... | H01R 12/88 |
| | | | | 439/66 |
| 7,632,105 B2* | 12/2009 | Yan | ............... | H01R 13/2442 |
| | | | | 439/66 |
| 7,717,760 B2* | 5/2010 | Ma | ............... | H01R 12/89 |
| | | | | 439/135 |
| 8,501,340 B2* | 8/2013 | Kim | ............... | H01M 2/202 |
| | | | | 429/121 |
| 8,574,008 B2* | 11/2013 | Grobetae | ............... | H01M 2/202 |
| | | | | 439/627 |
| 8,777,668 B2* | 7/2014 | Ikeda | ............... | H01M 2/1077 |
| | | | | 439/627 |
| 8,808,031 B2* | 8/2014 | Zhao | ............... | H01M 2/206 |
| | | | | 439/620.27 |
| 2003/0124902 A1* | 7/2003 | Wu | ............... | H01R 13/2457 |
| | | | | 439/500 |
| 2004/0043663 A1* | 3/2004 | Ikeda | ............... | H01M 2/206 |
| | | | | 439/627 |
| 2014/0087591 A1* | 3/2014 | Ikeda | ............... | H01M 2/206 |
| | | | | 439/627 |
| 2014/0329413 A1* | 11/2014 | Ogasawara | ............... | H01M 2/043 |
| | | | | 439/627 |
| 2015/0270666 A1* | 9/2015 | Callicoat | ............... | H01R 25/16 |
| | | | | 439/627 |
| 2016/0072116 A1* | 3/2016 | Yanagihara | ............... | H01M 2/202 |
| | | | | 429/90 |

* cited by examiner

US 9,882,194 B2

CONDUCTIVE CONNECTING PLATE FOR A LITHIUM BATTERY AND A METHOD FOR FORMING THE SAME

BACKGROUND OF THE INVENTION

Field of Invention

The present invention relates to a conductive connecting plate for a lithium battery and a method for forming the same, and more particularly, to a conductive connecting plate for a lithium battery and a method for forming the same where the conductive connecting plate is suitable for the charge and discharge of high-rate and large current and safe to be used.

Prior Art

A conventional lithium battery core mainly comprises a case within which an electrolyte solution and a lithium battery winding core are located. The lithium battery winding core is formed by continuous winding an anode plate, an insulation sheet, and a cathode plate. The anode plate is welded with an anode tab, and the anode tab is then welded onto the internal wall of the case, so as to establish an electrical connection between the case and a anode terminal post. The cathode plate is welded with a cathode tab, and the cathode tab is then welded upwardly onto the bottom of a cathode terminal post of the case. Thereby, the anode terminal post and the cathode terminal post can be respectively screwed into a nut through an external screw thread disposed on a top of the anode terminal post and the cathode terminal post for fixing different wiring terminals, so as to output a positive and a negative power respectively.

However, since the cathode tab is extended from the cathode plate and then welded to the bottom of the cathode terminal post, and thus its processing procedure is complicated. Moreover, because the anode tab is welded onto the internal wall of the case and the cathode tab is welded to the cathode terminal post, it would be difficult to control the welding quality and the contacts are usually only of point contacts. Therefore, it would cause the shortcomings such as poor conduction and poor heat dissipation, and thus is only suitable for the electricity storage of small current, but not for the charge and discharge of high-rate and large current.

SUMMARY OF THE INVENTION

In view of the shortcomings mentioned above, the present invention is aimed at providing a novel structure distinguished from the conventional one and at overcoming these drawbacks.

An object of the present invention is to provide a conductive connecting plate for a lithium battery and a method for forming the same, where one end of an elongated positioning plate is bent to form a bending plate and at least one side of the bending plate is bent vertically to form an extending plate, so as to establish a large-area electrical connection between the extending plate and a tab set of a winding core, and to overcome the shortcoming that the welding quality is difficult to be controlled because the welding is in point contacts and thus the conventional lithium battery is only suitable to be used for the electricity storage of small current, and consequently to make the conduction and heat dissipation more effective, fulfill the requirement for the charge and discharge of high-rate and large current, and ensure the safety of use.

Another object of the present invention is to provide a conductive connecting plate for a lithium battery and a method for forming the same, where a metal plate in a generally linear shape is punched to form an elongated positioning plate, a bending plate, and at least one extending plate, so as to reduce the area of waste material during the punching process and thus reduce the manufacturing cost.

In order to achieve the above-mentioned objects, the present invention provides a conductive connecting plate for a lithium battery comprising an elongated positioning plate, a bending plate, and a first extending plate. The elongated positioning plate has a first end and a second end opposite to the first end in an elongated direction, and the elongated positioning plate is provided to be in electrical connection with a terminal component on a top of a lithium battery core. The bending plate extends downwardly from the second end of the elongated positioning plate in a direction away from the second end and generally perpendicular to the elongated positioning plate. The first extending plate extends horizontally from one side of the bending plate in a direction away from the side of the bending plate and generally perpendicular to the bending plate and is provided to be in electrical connection with a tab set of the lithium battery core.

In implementation, the elongated positioning plate comprises a positioning part, a bending part, and an extending part that are extended in sequence along the elongated direction. The positioning part is provided to be in electrical connection with the terminal component on the top of the lithium battery core, and the bending part extends horizontally downwards at an angle from one end of the positioning part in a direction away from the end, so as to form a space between a lower portion of the positioning part and the bending part. The extending part extends horizontally from one end of the bending part in a direction away from the end of the bending part.

In implementation, the present invention further comprises a second extending plate, the second extending plate extends from another side of the bending plate in a direction generally perpendicular to the bending plate, and the first extending plate and the second extending plate are parallel to each other.

In implementation, one end of the first extending plate is provided with a first guiding plate, one end of the second extending plate is provided with a second guiding plate, and the first guiding plate and the second guiding plate extend respectively from the ends of the first extending plate and the second extending plate in a direction away from each other.

In implementation, The present invention further comprises a third extending plate, wherein the bending plate includes a base and at least two parallel lower protruding parts extending downwards from the base's bottom; the first extending plate extends horizontally from one side of one lower protruding part in a direction away from the side and generally perpendicular to the lower protruding part; and the third extending plate extends horizontally from one side of another lower protruding part in a direction away from the side and generally perpendicular to the another lower protruding part.

In implementation, the present invention further comprises a fourth extending plate, wherein the fourth extending plate extends from another side of another lower protruding part in a direction generally perpendicular to the another lower protruding part, and the third extending plate and the fourth extending plate are parallel to each other.

In implementation, one end of the third extending plate is provided with a third guiding plate, one end of the fourth extending plate is provided with a fourth guiding plate, and the third guiding plate and the fourth guiding plate extend respectively from the ends of the third extending plate and the fourth extending plate in a direction away from each other.

The present invention also provides a method for forming a conductive connecting plate for a lithium battery, comprising steps of: a. providing an elongated metal plate in a generally linear shape; b. punching the metal plate to form an elongated positioning plate, a bending plate, and a first extending plate; c. punching the bending plate to have the bending plate extended downwards in a direction generally perpendicular to the elongated positioning plate; and d. punching the first extending plate to have the first extending plate horizontally extended in a direction generally perpendicular to the bending plate.

In implementation, the method according to the present invention further comprises a step after the step b: punching the elongated positioning plate to form a positioning part, a bending part, and an extending part that are extended in sequence along an elongated direction, where the bending part is extended horizontally downwards at an angle from one end of the positioning part in a direction away from the end, so as to form a space between a lower portion of the positioning part and the bending part; and the extending part is extended horizontally from one end of the bending part in a direction away from the end.

In implementation, the method according to the present invention further comprises a step after the step b: punching a second extending plate, a first guiding plate, and a second plate, so that the second extending plate is extended from another side of the bending plate in a direction generally perpendicular to the bending plate; the first extending plate and the second extending plate are parallel to each other; and the first guiding plate and the second guiding plate are extended respectively from the ends of the first extending plate and the second extending plate in a direction away from each other.

The present invention will become more fully understood by reference to the following detailed description thereof when read in conjunction with the attached drawings.

DETAILED DESCRIPTION OF THE INVENTION

Figure 1:
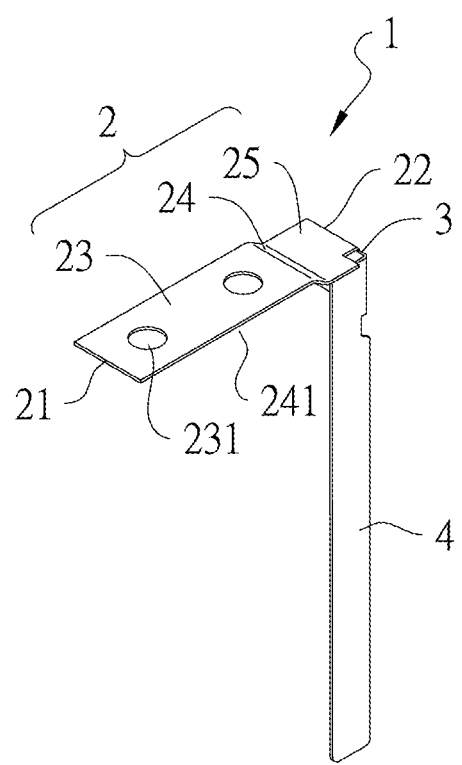
FIG. 1 is a perspective view showing a first embodiment of a conductive connecting plate for a lithium battery according to the present invention.
Figure 2:
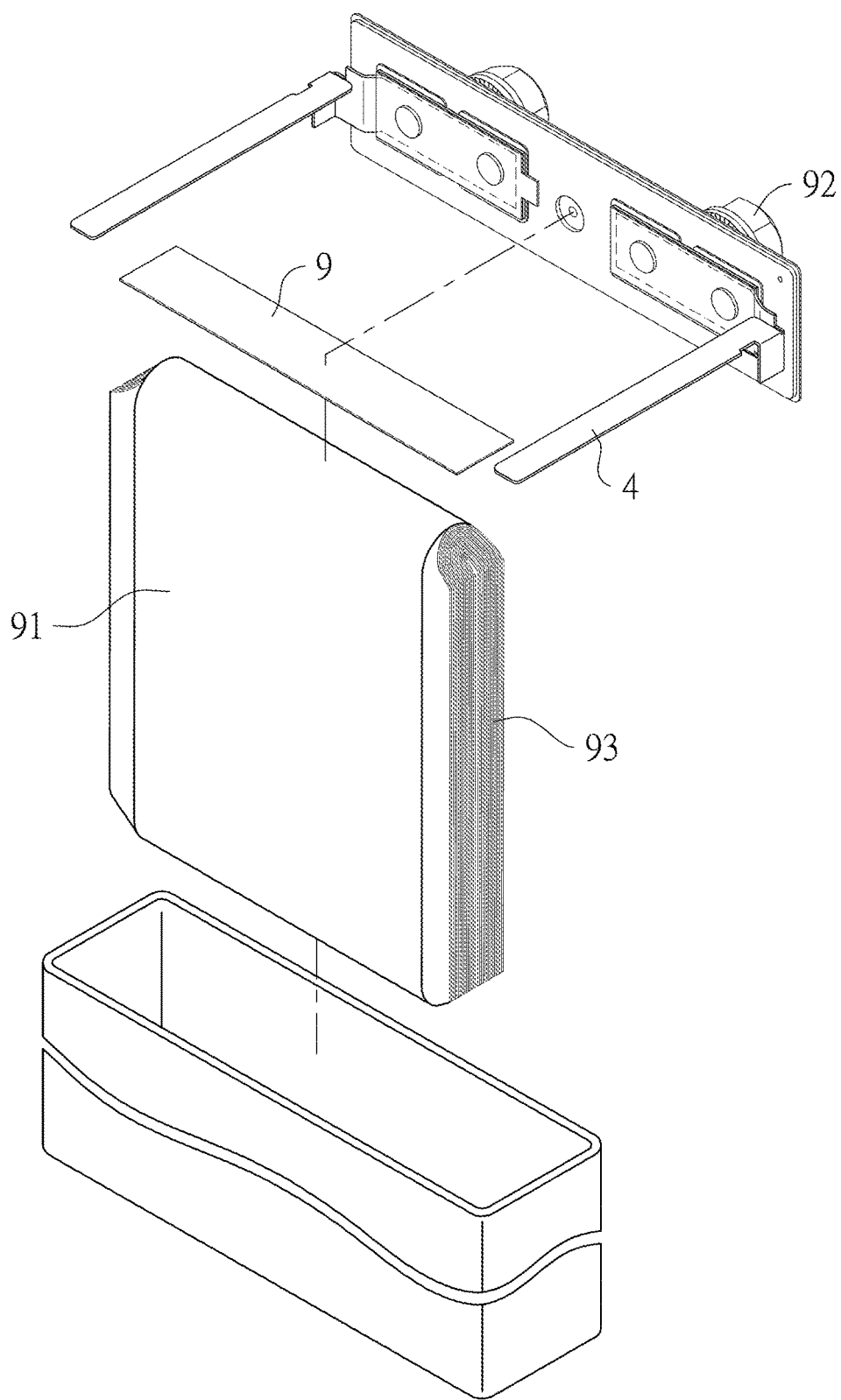
FIG. 2 shows the use of the first embodiment of the conductive connecting plate for a lithium battery according to the present invention.

Please refer to FIG. 1, which shows a first embodiment of a conductive connecting plate 1 for a lithium battery according to the present invention. The conductive connecting plate 1 is formed by bending an elongated metal plate in a generally linear shape and comprises an elongated positioning plate 2, a bending plate 3, and a first extending plate 4.

The elongated positioning plate 2 is a generally rectangular plate. The elongated positioning plate 2 has a first end 21 and a second end 22 opposite to the first end 21 in an elongated direction. The elongated positioning plate 2 comprises a positioning part 23, a bending part 24, and an extending part 25 that are extended in sequence along the elongated direction. The positioning part 23 is provided with two holes 231 on its plate surface. The bending part 24 extends horizontally downwards at an angle from one end of the positioning part 23 in a direction away from the end, so as to form a space 241 between the lower portion of the positioning part 23 and the bending part 24. The extending part 25 extends horizontally from one end of the bending part 24 in a direction away from the end.

The bending plate 3 is a upright plate and extends downwardly from the second end 22 of the elongated positioning plate 2 in a direction away from the second end 22 and generally perpendicular to the elongated positioning plate 2. The first extending plate 4 is a rectangular upright plate and extends horizontally from one side of the bending plate 3 in a direction away from the side while toward the first end 21 of the elongated positioning plate 2 and generally perpendicular to the bending plate 3.

Thereby, when an insulation adhesive plate 9 is located in the space 241 between the positioning part 23 and the bending part 24 of the elongated positioning plate 2 while the positioning part 23 is in electrical connection with a terminal component 92 on a top of a lithium batter core 91, it is able to weld the first extending plate 4 onto a tab set 93 provided at one side of the lithium battery core 91, so as to establish a large-area electrical connection between the first extending plate 4 and the tab set 93.

Figure 3:
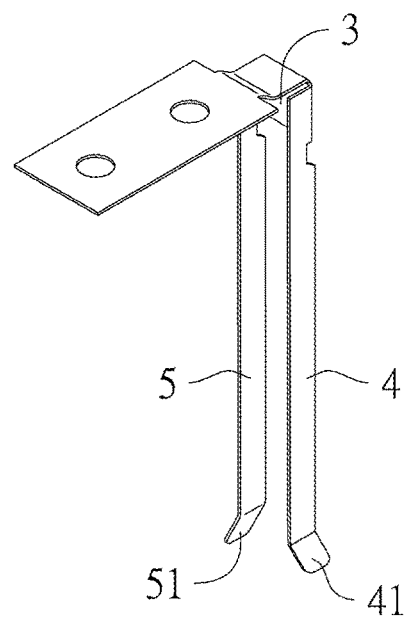
FIG. 3 is a perspective view showing a second embodiment of a conductive connecting plate for a lithium battery according to the present invention.

Please refer to FIG. 3, which shows a perspective view showing a second embodiment of a conductive connecting plate 1 for a lithium battery according to the present invention. This embodiment is different from the first one in that: a second extending plate 5 is extended from another side of the bending plate 3 in a direction generally perpendicular to the bending plate 3, and the first extending plate 4 and the second extending plate 5 are parallel to each other. Thereby, when the first extending plate 4 and the second extending plate 5 are respectively welded to the tab set 93 provided at one side of the lithium battery core 91, it is able to increase the welding area with the tab set 93. Moreover, one end of the first extending plate 4 is provided with a first guiding plate 41, one end of the second extending plate 5 is provided with a second guiding plate 51, and the first guiding plate 41 and the second guiding plate 51 are extended respectively from the ends of the first extending plate 4 and the second extending plate 5 in a direction away from each other. Thereby, when the tab set 93 provided at one side of the lithium battery core 91 is inserted in-between the first extending plate 4 and the second extending plate 5, it is able to prevent the occurrence of short circuit caused by the piercing of the tab set 93 and is convenient for operation.

Figure 4:
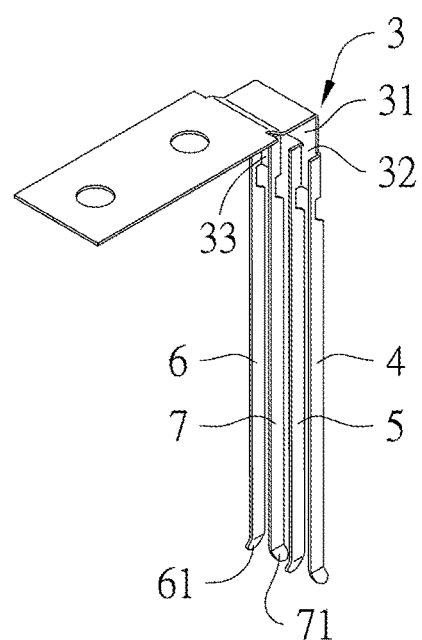
FIG. 4 is a perspective view showing a third embodiment of a conductive connecting plate for a lithium battery according to the present invention.

Please refer to FIG. 4, which shows a third embodiment of a conductive connecting plate 1 for a lithium battery according to the present invention. This embodiment is different from the first one and the second one in that: the bending plate 3 includes a base 31 and two parallel lower protruding parts 32, 33 extended downwards from the bottom of the base 31. The first extending plate 4 and the second extending plate 5 are extended horizontally from two sides of one lower protruding part 32 in a direction away from the two sides and generally perpendicular to the lower protruding part 32. A third extending plate 6 and a fourth extending plate 7 are extended horizontally from two sides of another lower protruding part 33 in a direction away from the two sides and generally perpendicular to the another lower protruding part 33. The third extending plate 6 and the fourth extending plate 7 are parallel to each other. Moreover, one end of the third extending plate 6 is provided with a third guiding plate 61, one end of the fourth extending plate 7 is provided with a fourth guiding plate 71, and the third guiding plate 61 and the fourth guiding plate 71 extend respectively from the ends of the third extending plate 6 and the fourth extending plate 7 in a direction away from each other.

Figure 5:
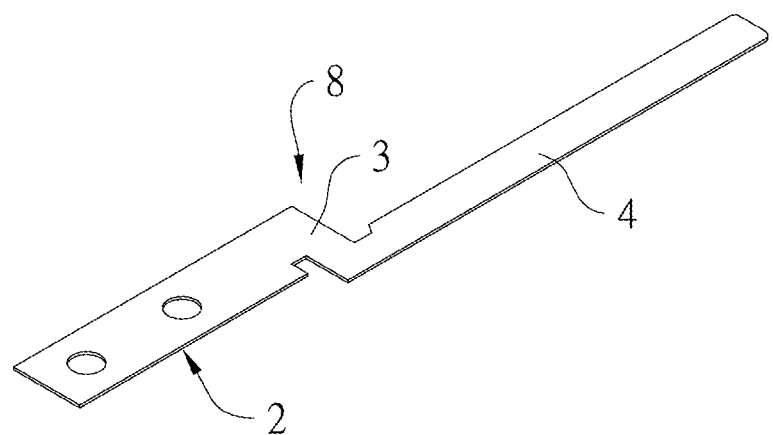
FIG. 5 is a perspective view showing a metal plate in a linear shape used in a method for forming the conductive connecting plate for a lithium battery in the first embodiment according to the present invention.
Figure 6:
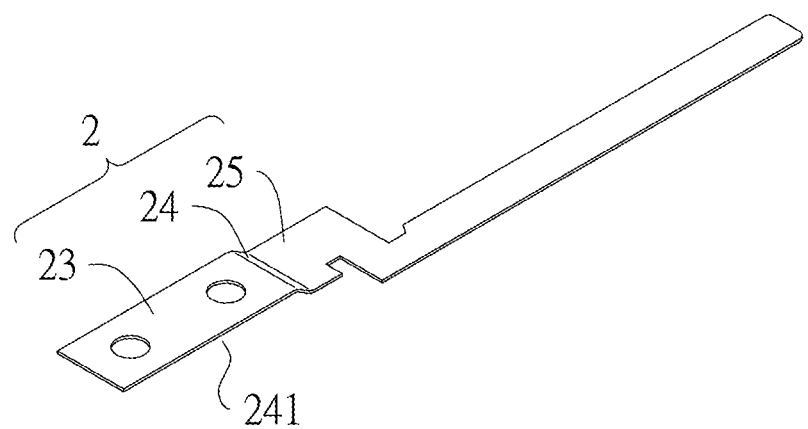
FIG. 6 is a perspective view showing a punched elongated positioning plate in the method for forming the conductive connecting plate for a lithium battery in the first embodiment according to the present invention.
Figure 7:
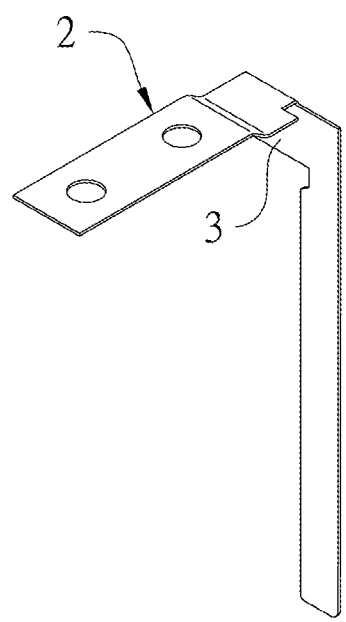
FIG. 7 is a perspective view showing the formation of a bending plate in the method for forming the conductive connecting plate for a lithium battery in the first embodiment according to the present invention.

In implementation, a method for forming the conductive connecting plate 1 in the first embodiment comprises steps of:

a. providing an elongated metal plate 8 in a generally linear shape as shown in FIG. 5;
b. punching the metal plate 8 to form an elongated positioning plate 2, a bending plate 3, and a first extending plate 4;
c. as shown in FIG. 6, punching the elongated positioning plate 2 to form a positioning part 23, a bending part 24, and an extending part 25 that are extended in sequence along an elongated direction, where the bending part 24 is extended horizontally downwards at an angle from one end of the positioning part 23 in a direction away from the end, so as to form a space between a lower portion of the positioning part 23 and the bending part 24; and the extending part 25 is extended horizontally from a bottom of the bending part 24 in a direction away from the bottom;
d. as shown in FIG. 7, punching the bending plate 3 to have the bending plate 3 generally perpendicular to the elongated positioning plate 2 and extended downwards; and
e. as shown in FIG. 1, punching the first extending plate 4 to have the first extending plate 4 horizontally extended in a direction generally perpendicular to the bending plate 3 and toward the first end 21 of the elongated positioning plate 2.

Please refer to FIG. 3, which shows a method for forming the conductive connecting plate 1 for a lithium battery in the second embodiment. In this embodiment, in step b, a second extending plate 5 is simultaneously punched. In step c, one end of the first extending plate 4 and one end of the second extending plate 5 are punched respectively to form a first guiding plate 41 and a second guiding plate 51. In step e, while the first extending plate 4 is punched, the second extending plate 5 is extended from another side of the bending plate 3 in a direction generally perpendicular to the bending plate 3, the first extending plate 4 is made parallel to the second extending plate 5, and the first guiding plate 41 and the second guiding plate 51 are extended respectively from the ends of the first extending plate 4 and the second extending plate 5 in a direction away from each other.

As shown in FIG. 4, a method for forming the conductive connecting plate 1 for a lithium battery in the third embodiment is different from the formation method for the second embodiment lies in that: in step b, a bending plate 3, a third extending plate 6, and a fourth extending plate 7 are punched simultaneously, so as to have the bending plate 3 to include a base 31 and two parallel lower protruding parts 32, 33 that are extended downwards from one end of the base 31; in step c, one end of the third extending plate 6 and one end of the fourth extending plate 7 are punched respectively to form a third guiding plate 61 and a fourth guiding plate 71; and in step e, the third extending plate 6 is made to be parallel to the fourth extending plate 7, and the third guiding plate 61 and the fourth guiding plate 71 are extended respectively from the ends of the third extending plate 6 and the fourth extending plate 7 in a direction away from each other.

Therefore, the present invention has the following advantages:

1. According to the present invention, the conductive connecting plate is formed integratedly by punching a metal plate, and a plurality of extending plates are formed to be in large-area electrical connection with a tab set. Thereby, it is able to stabilize the voltage and current, fulfill the requirement of the charge and discharge of high-rate and large current, make the heat dissipation effective, lengthen the service time, and ensure the safety of use.

2. According to the present invention, the conductive connecting plate is formed integratedly by punching a metal plate in a generally linear shape to form an elongated positioning plate, a bending plate, and at least one extending plate. Thereby, the area of the waste material could be reduced effectively during the punching process for the metal plate, so as to save the manufacturing cost.

3. According to the present invention, one end of the first extending plate and one end of the second extending plate of the conductive connecting plate are respectively provided with a first guiding plate and a second guiding plate. Thereby, it would be convenient for an operator to insert the tab set provided at one side of a lithium battery core in-between the first extending plate and the second extending plate, so as to prevent the occurrence of short-circuiting caused by the piercing of the tab set during the assembling process and ensure the safety of use.

4. According to the present invention, a space is formed between the elongated positioning plate and the bending plate. Thereby, an insulation adhesive plate could be securely located in-between the lithium battery core and the terminal component, so as to prevent the displacement of the insulation adhesive plate and thus ensure the safety of use.

Therefore, according to above-disclosed descriptions, the present invention can achieve the expected objects to provide a conductive connecting plate for a lithium battery, which could fulfill the requirement of the charge and the discharge of the high-rate and large current, improve the conductivity and the heat dissipation, reduce the manufacturing cost, and ensure the safety of use. It is novel and has industrial use.

What is claimed is:

1. A conductive connecting plate for a lithium battery, comprising:
an elongated positioning plate, having a first end and a second end opposite to the first end in an elongated direction, the elongated positioning plate provided to be in electrical connection with a terminal component on a top of a lithium battery core;
a bending plate, extending downwardly from the second end of the elongated positioning plate in a direction away from the second end and generally perpendicular to the elongated positioning plate; and a first extending plate, extending horizontally from one side of the bending plate in a direction away from the side and toward the first end and generally perpendicular to the bending plate, provided to be in electrical connection with a tab set of the lithium battery core, wherein the elongated positioning plate comprises a positioning part, a bending part, and an extending part that are extended in sequence along the elongated direction; the positioning part is provided to be in electrical connection with the terminal component on the top of the lithium battery core, and the bending part extends horizontally downwards at an angle from one end of the positioning part in a direction away from the end, so as to form a space between a lower portion of the positioning part and the bending part; and the extending part extends horizontally from one end of the bending part in a direction away from the end.

2. The conductive connecting plate of a lithium battery according to claim 1, further comprising a second extending plate, wherein the second extending plate extends from another side of the bending plate in a direction generally perpendicular to the bending plate, and the first extending plate and the second extending plate are parallel to each other.

3. The conductive connecting plate of a lithium battery according to claim 2, wherein one end of the first extending plate is provided with a first guiding plate, one end of the second extending plate is provided with a second guiding plate, and the first guiding plate and the second guiding plate extend respectively from the ends of the first extending plate and the second extending plate in a direction away from each other.

4. The conductive connecting plate of a lithium battery according to claim 1, further comprising a third extending plate, wherein the bending plate includes a base and at least two parallel lower protruding parts extending downwards from the base's bottom; the first extending plate extends horizontally from one side of one lower protruding part in a direction away from the side and generally perpendicular to the lower protruding part; and the third extending plate extends horizontally from one side of another lower protruding part in a direction away from the side and generally perpendicular to the another lower protruding part.

5. The conductive connecting plate of a lithium battery according to claim 4, further comprising a fourth extending plate, wherein the fourth extending plate extends from another side of the another lower protruding part in a direction generally perpendicular to the another lower protruding part, and the third extending plate and the fourth extending plate are parallel to each other.

6. The conductive connecting plate of a lithium battery according to claim 5, wherein one end of the third extending plate is provided with a third guiding plate, one end of the fourth extending plate is provided with a fourth guiding plate, and the third guiding plate and the fourth guiding plate extend respectively from the ends of the third extending plate and the fourth extending plate in a direction away from each other.

7. The conductive connecting plate of a lithium battery according to claim 1, further comprising a second extending plate, wherein the second extending plate extends from another side of the bending plate in a direction generally perpendicular to the bending plate, and the first extending plate and the second extending plate are parallel to each other.

8. The conductive connecting plate of a lithium battery according to claim 7, wherein one end of the first extending plate is provided with a first guiding plate, one end of the second extending plate is provided with a second guiding plate, and the first guiding plate and the second guiding plate extend respectively from the ends of the first extending plate and the second extending plate in a direction away from each other.

9. The conductive connecting plate of a lithium battery according to claim 1, further comprising a third extending plate, wherein the bending plate includes a base and at least two parallel lower protruding parts extending downwards from the base's bottom; the first extending plate extends horizontally from one side of one lower protruding part in a direction away from the side and generally perpendicular to the lower protruding part; and the third extending plate extends horizontally from one side of another lower protruding part in a direction away from the side and generally perpendicular to the another lower protruding part.

10. The conductive connecting plate of a lithium battery according to claim 9, further comprising a fourth extending plate, wherein the fourth extending plate extends from another side of another lower protruding part in a direction generally perpendicular to the another lower protruding part, and the third extending plate and the fourth extending plate are parallel to each other.

11. The conductive connecting plate of a lithium battery according to claim 10, wherein one end of the third extending plate is provided with a third guiding plate, one end of the fourth extending plate is provided with a fourth guiding plate, and the third guiding plate and the fourth guiding plate extend respectively from the ends of the third extending plate and the fourth extending plate in a direction away from each other.

* * * * *